(12) United States Patent
Furue et al.

(10) Patent No.: US 8,910,585 B2
(45) Date of Patent: Dec. 16, 2014

(54) THERMAL INDICATOR (71) Applicant: NiGK Corporation, Kawagoe-shi, Saitama (JP)

(72) Inventors: Ryuji Furue, Kawagoe (JP); Suguru Ogawa, Kawagoe (JP)

(73) Assignee: NiGK Corporation, Kawagoe-shi, Saitama (JP)

( * ) Notice: Subject to any disclaimer, the term of this patent is extended or adjusted under 35 U.S.C. 154(b) by 0 days.

(21) Appl. No.: 14/356,797

(22) PCT Filed: Nov. 19, 2012

(86) PCT No.: PCT/JP2012/079941
§ 371 (c)(1),
(2), (4) Date: May 7, 2014

(87) PCT Pub. No.: WO2013/077287
PCT Pub. Date: May 30, 2013

(65) Prior Publication Data
US 2014/0318438 A1 Oct. 30, 2014

(30) Foreign Application Priority Data
Nov. 25, 2011 (JP) ................................. 2011-257439

(51) Int. Cl.
*G01K 11/06* (2006.01)
*G01K 11/12* (2006.01)

(52) U.S. Cl.
CPC ................ *G01K 11/06* (2013.01); *G01K 11/12* (2013.01)
USPC ....................................... 116/219

(58) Field of Classification Search
CPC ........ G01K 11/06; G01K 11/08; G01K 11/12
USPC .......... 116/207, 216, 217, 219; 374/106, 162, 374/E11.006, E11.007, E11.018; 422/82.12; 426/88
See application file for complete search history.

(56) References Cited

U.S. PATENT DOCUMENTS 5,368,905 A 11/1994 Ohno
2011/0280775 A1 11/2011 Suda et al.

FOREIGN PATENT DOCUMENTS

JP  S50-32980 A  3/1975
JP  S56-94936 U  7/1981

(Continued)

OTHER PUBLICATIONS

International Search Report of PCT/JP2012/079941, mailed Jan. 29, 2013.

*Primary Examiner* — Daniel S Larkin
*Assistant Examiner* — Irving A Campbell
(74) *Attorney, Agent, or Firm* — Collard & Roe, P.C.

(57) ABSTRACT

A heat-sensitive indicator that prevents a solid-state colored hot-meltable substance from being absorbed into an absorber and surely absorbs a colored melt includes an ampule bottle enclosing a colored heat-sensitive material that melts into a colored melt at a predetermined temperature, a composite membrane rolled cylindraceous body joining an absorbable membrane for the colored melt onto one surface side of an impermeable membrane for the colored melt so that the impermeable membrane is located inside thereof, and a tube inserting and sealing the ampule bottle into a space surrounded by the impermeable membrane through which the absorbable membrane color is visible from the outside. After part of the ampule bottle is broken below the melting point of the colored heat-sensitive material to discharge a portion of the heat-sensitive material into the space and the heat-sensitive material is melted, a colored portion of the absorbable membrane is formed.

9 Claims, 3 Drawing Sheets

(56) References Cited

FOREIGN PATENT DOCUMENTS

| | | |
|---|---|---|
| JP | 59-084128 A | 5/1984 |
| JP | H05-72054 A | 3/1993 |
| JP | H06-050825 A | 2/1994 |
| JP | 07-151613 A | 6/1995 |
| JP | 08-043214 A | 2/1996 |
| JP | 2010-175350 A | 8/2010 |

THERMAL INDICATOR

CROSS REFERENCE TO RELATED APPLICATIONS

This application is the National Stage of PCT/JP2012/079941 filed on Nov. 19, 2012, which claims priority under 35 U.S.C. §119 of Japanese Application No. 2011-257439 filed on Nov. 25, 2011, the disclosures of which are incorporated by reference. The international application under PCT article 21(2) was not published in English.

TECHNICAL FIELD

The present invention relates to a heat-sensitive indicator that irreversibly indicates a signal when it is heated to or over a predetermined temperature.

BACKGROUND OF THE ART

During transportation, etc. of frozen or refrigerated foods, if these foods accidentally meet a temperature of the predetermined temperature or over, these frozen or refrigerated foods could inadvertently be deteriorated or decomposed. Therefore, strict temperature control management should be carried out to preserve the frozen or refrigerated foods. In the field of medical care, temperature control in preserving particular kind of medicinal drugs, blood, specimen, etc. play an important role. These products could deteriorate rapidly when the temperature rises, and such products may not be used if things go wrong.

For controlling such temperature, heat-sensitive indicators that irreversibly indicate a signal in a case where a temperature rises to or over a predetermined temperature, have been used so far. Checking these heat-sensitive indicators allows us to know whether or not the storage temperature during transportation exceeded the upper limit of a temperature control range. Such heat-sensitive indicators are disclosed in Patent Documents 1-3 described below. The heat-sensitive indicator disclosed in Patent Documents 1-3 comprises: a colored hot-meltable substance which melts at a predetermined temperature; an absorber which absorbs or is permeated with the melt of the colored hot-meltable substance; and a separating member such as separating membrane, etc. which maintains the colored hot-meltable substance away from the absorber without contacting to each other. At the time the heat-sensitive indicator is used, the separating member is broken under a temperature lower than the melting temperature of the colored hot-meltable substance, bringing the colored hot-meltable substance into contact with the absorber. When the colored hot-meltable substance is melted by raising the temperature of an environment in which the heat-sensitive indicator is placed, then the molten material of the colored hot-meltable substance is absorbed into the absorber, thereby the absorber is colored. The color on the absorber does not disappear even when the temperature of the environment is brought down to a temperature lower than the melting point of the colored hot-meltable substance.

PRIOR ART DOCUMENT

Patent Document

[Patent Document 1] Japanese Unexamined Patent Application Publication No. H05-72054A
[Patent Document 2] Japanese Unexamined Patent Application Publication No. 1106-50825A
[Patent Document 3] Japanese Unexamined Patent Application Publication No. 2010-175350A

SUMMARY OF THE INVENTION

Problems to be Solved by the Invention

According to the conventional heat-sensitive indicator described above, whether or not the temperature of the environment in which the heat-sensitive indicator was placed was raised to or over the melting temperature of the colored hot-meltable substance, can be checked by confirming the presence or absence of the coloration on the absorber. However, even at a low temperature lower than the melting temperature of the colored hot-meltable substance, in other words, in a frozen or refrigerated state, the colored hot-meltable substance often gradually permeates the absorber to color the absorber. In such a case, the indication of the heat-sensitive indicator is an erroneous sign, leading to make a wrong evaluation.

The present invention has been developed to solve the aforementioned problems. And an object of the present invention is to provide a heat-sensitive indicator that prevents a colored hot-meltable substance from being absorbed into an absorber when the temperature of the heat-sensitive indicator in the environment is lower than the melting temperature of the colored hot-meltable substance, and that can indicate an accurate temperature, because the molten material of the colored hot-meltable substance is surely absorbed into the absorber at or over the melting temperature of the colored hot-meltable substance.

Means to Solve the Problems

A heat-sensitive indicator of claim 1 of the present invention, which was made to achieve the aforementioned objects, comprises:

an elongated ampule bottle enclosing a colored heat-sensitive material that melts into a colored melt at a predetermined temperature, a rolled cylindraceous body of a composite membrane joining an absorbable membrane that absorbs the colored melt of the colored heat-sensitive material, onto one surface side of an impermeable membrane that is impermeable to the colored melt, so that the impermeable membrane is located inside the rolled cylindraceous body, and a tube inserting and sealing the ampule bottle into a space surrounded by the impermeable membrane of the cylindraceous body, through which a color of the absorbable membrane can be visibly recognized from the outside of the tube;

wherein, after at least a part of the ampule bottle is broken below inciting point of the colored heat-sensitive material to discharge or to make it possible to discharge at least a portion of the solid-state colored heat-sensitive material into the space surrounded by the impermeable membrane, the colored melt is absorbed through an edge portion of the absorbable membrane which is positioned at an edge surface of the cylindraceous body and then the solid-state colored heat-sensitive material is melted, a formed colored portion of the absorbable membrane can be visibly recognized from the outside of the tube.

In the heat-sensitive indicator, the colored heat-sensitive material contains a hot-meltable substance, which melts at a predetermined temperature, including a coloring material.

In the heat-sensitive indicator, the impermeable membrane of the composite membrane is a metal film and the absorbable membrane of the composite membrane is a paper.

In the heat-sensitive indicator, the metal film is an aluminum foil or an aluminum-deposited film.

In the heat-sensitive indicator, an impermeable membrane of the composite membrane is a resin film, and an absorbable membrane of the composite membrane is a paper.

In the heat-sensitive indicator, the tube is a transparent tube made of resin, and the tube deforms elastically when at least a part of the ampule bottle is broken.

In the heat-sensitive indicator, the ampule bottle is made of glass.

In the heat-sensitive indicator, an amount of the colored heat-sensitive material, when becomes the colored melt, in the tube is 1% or more by volume based on a capacity of the tube.

In the heat-sensitive indicator, the colored heat-sensitive material has a melting temperature of 10° C. at the highest.

Effect of the Invention

In the heat-sensitive indicator of the present invention, at least a part of the ampule bottle is broken to discharge or to make it possible to discharge at least a portion of the solid-state colored heat-sensitive material into a space that is surrounded by the impermeable membrane of the composite membrane that wraps up the ampule bottle. Therefore, the solid-state colored heat-sensitive material and the absorbable membrane are positioned in non-contacting arrangement when the colored heat-sensitive material is in a non-melting state, so that the solid-state colored heat-sensitive material is prevented from penetrating into the absorbable membrane. As the result, when the solid-state colored heat-sensitive material which is discharged or made it possible to be discharged into the space surrounded by the impermeable membrane of the composite membrane, is melted into the colored melt, the colored melt is absorbed through an edge portion of the absorbable membrane, which is positioned at an edge surface of the composite membrane, thereby the absorbable membrane is colored. In the heat-sensitive indicator of the present invention, the absorbable membrane is colored for the first time when the colored heat-sensitive material is melted into the colored melt. Therefore, the heat-sensitive indicators which are placed in preserving atmospheres can surely indicate that temperatures of the atmospheres at or over the melting point of the colored heat-sensitive material, being able to improve reliability of the heat-sensitive indicators.

MODE FOR CARRYING OUT THE INVENTION

Preferred embodiments of the present invention will be precisely described below, but the scope of the present invention should not be limited to these embodiments.

Figure 1:
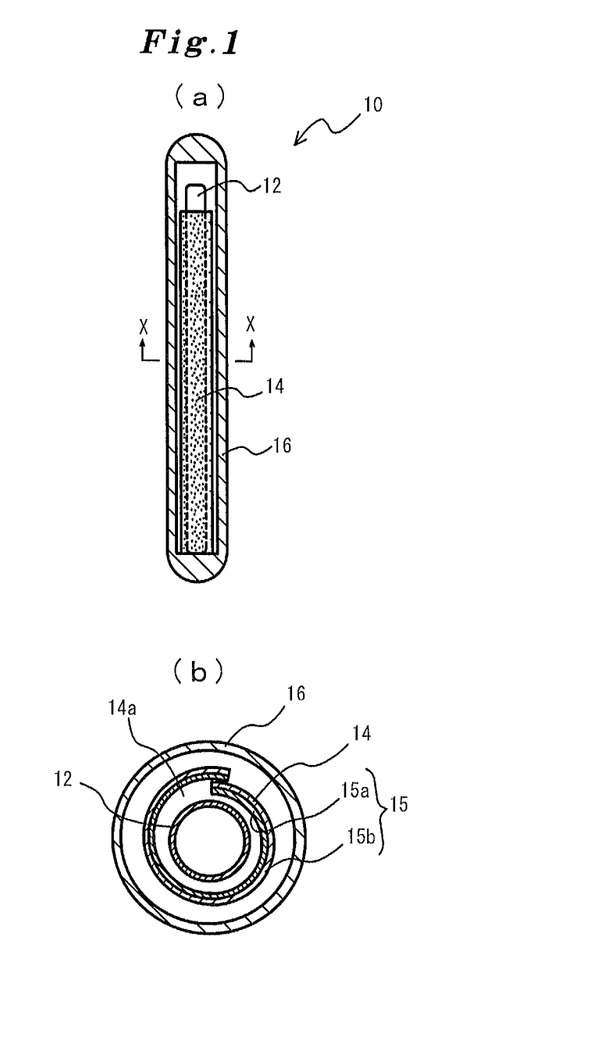
FIG. 1 includes a vertical cross-sectional view and a transverse sectional view both of which show an embodiment of the heat-sensitive indicator of the present invention.

FIG. 1 shows an example of a heat-sensitive indicator of the present invention. FIG. 1(a) is a vertical cross-sectional view showing the heat-sensitive indicator 10. FIG. 1(b) shows a transverse sectional view viewed from X-X line shown in FIG. 1(a). In the heat-sensitive indicator 10 shown in FIG. 1, an elongated ampule bottle 12 made of glass in which a colored heat-sensitive material is enclosed, is inserted into a space 14a of a cylindraceous body 14 formed by rolling up a piece of a composite membrane 15 so as for portions adjacent to both edge portions of composite membrane 15 to be partly overlapped and laminated with each other. Thus prepared cylindraceous body 14 is enclosed into a transparent resin-made tube 16. The colored heat-sensitive material enclosed in the ampule bottle 12 is to be melted into a colored melt at a predetermined temperature. The ampule bottle 12 preferably has a diameter measuring 1-10 mm. When the ampule bottle 12 has a diameter of less than 1 mm, it becomes difficult for the colored melt to be discharged through a broken opening of the ampule bottle 12, as described later. When the diameter exceeds 10 mm, the ampule bottle 12 becomes difficult to break.

In the composite membrane 15 which is used for forming the cylindraceous body 14 into which the ampule bottle 12 is inserted as shown in FIG. 1(b), an absorbable membrane 15b which absorbs the colored melt is bonded to one surface of an impermeable membrane 15a that is impermeable to a colored melt of the colored heat-sensitive material. Due to such configuration, the ampule bottle 12 is inserted into the space 14a surrounded by the impermeable membrane 15a. As such impermeable membrane 15a, a resin film or a metal film can be employed. However, when the metal film is used, thermal conductivity of the composite membrane 15 can be improved and the heat sensitivity of the heat-sensitive indicator 10 can also be improved. As the metal film, an aluminum-deposited film or an aluminum foil is preferably employed. As the absorbable membrane 15b which is bonded to the one surface of the impermeable membrane 15a, any membranes that absorb the colored melt can be used. Paper, particularly filter paper, can be preferably employed. The absorbable membrane 15b of the composite membrane 15 forms an outer peripheral surface of the cylindraceous body 14, so that color etc. of the absorbable membrane 15b can be visually recognized from the outside of the transparent tube 16.

The colored heat-sensitive material that is enclosed in the ampule bottle 12, and that contains a coloring material into a hot-meltable substance which melts at a predetermined temperature to be detected, particularly at a certain temperature that exceeds a desired freezing temperature or refrigerating temperature, is preferably used. The hot-meltable substance can be arbitrarily selected based on the upper limit temperature of a temperature-controlled atmosphere in which the heat-sensitive indicator 10 is placed. For example, when the upper limit temperature of the temperature-controlled atmosphere is not higher than a room temperature, the hot-meltable substance having a melting temperature not higher than the room temperature can be employed. In particular, in a case where the upper limit temperature of a temperature-controlled atmosphere is set to a temperature not higher than 10° C., the hot-meltable substance having a melting temperature not higher than 10° C. can be employed as the colored heat-sensitive material having a melting temperature not higher than 10° C. Specifically, when the upper limit temperature of a temperature-controlled atmosphere is set to 0° C., water can be employed as the hot-meltable substance. When the upper limit temperature of a temperature-controlled atmosphere is set to −12° C., ethylene glycol can be employed as the hot-meltable substance. When the upper limit temperature is set to −18° C., linseed oil can be employed as the hot-meltable substance. When the upper limit temperature is set to −11° C., dibutyl sebacate can be employed as the hot-meltable substance. When the upper limit temperature is set to −16° C., 2-octanone can be employed as the hot-meltable substance. The coloring material to be added to the hot-meltable substance is not specifically limited so long as it can dissolve or disperse in the hot-meltable substance. For example, native or artificial coloring agents can be employed. Paprika pigment (red), edible blue can be preferably used. Oil red RR, rose bengal, etc. can be employed.

The amount of the colored heat-sensitive material to be enclosed in the ampule bottle 12 is preferably not less than 1%, more preferably not less than 5% by volume based on the capacity of the tube 16 when the colored heat-sensitive material becomes the colored melt. When the amount of the colored heat-sensitive material to be enclosed in the ampule bottle 12 is less than 1% by volume based on the capacity of tube 16, it tends to become difficult to visually recognize the color of the absorbable membrane 15b from the outside of the tube 16.

When the heat-sensitive indicator 10 shown in FIG. 1 is used, as described later, at least a part of the ampule bottle 12 is broken, under a temperature lower than the melting temperature of the colored heat-sensitive material which is enclosed in the ampule bottle 12, to discharge or to make it possible to discharge at least a portion of the solid-state colored heat-sensitive material. At the time the ampule bottle 12 is broken, the tube 16 is elastically deformed at the same time because a breaking force is applied onto the ampule bottle 12 through the tube 16. When the breaking force is removed, the tube 16 elastically restores to its original attitude. A transparent resin which forms the tube 16, can be used a resin having elasticity at a temperature lower than melting temperature of the colored heat-sensitive material. The resin having a glass-transition point of 0° C. or lower is preferably used. Specifically, polypropylene resin or polyethylene resin is preferably used. The ampule bottle 12 can be broken easily by bending the ampule bottle 12 together with the straight tube 16.

Figure 2:
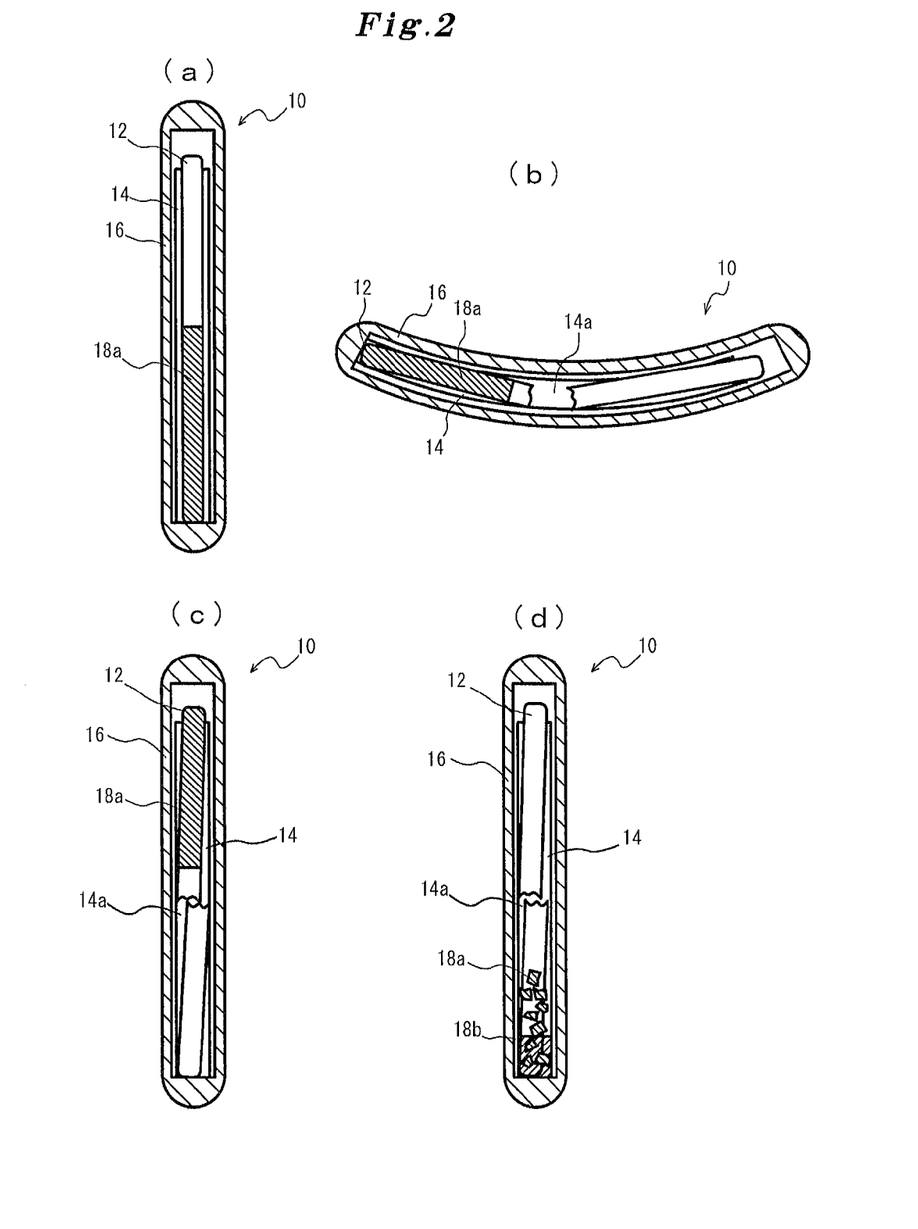
FIG. 2 includes illustrative views showing how to use the heat-sensitive indicator 10 of the present invention illustrated in FIG. 1.

The heat-sensitive indicator 10 shown in FIG. 1 is used as follows. First, the heat-sensitive indicator 10 is placed in an atmosphere whose temperature is lower than the melting temperature of the colored heat-sensitive material. Thereby the colored heat-sensitive material enclosed in the ampule bottle 12 becomes the solid-state colored heat-sensitive material 18a as shown in FIG. 2(a). Next, as shown in FIG. 2(b), in the temperature-controlled atmosphere, the straight tube 16 is bent together with the ampule bottle 12, so that the ampule bottle 12 is broken, thereby making it possible to discharge the solid-state colored heat-sensitive material 18a into the space 14a of the cylindraceous body 14. The space 14a, as shown in FIG. 1(b), is surrounded by the impermeable membrane 15a of the composite membrane 15. The tube 16 can be bent without break. When the force which is used to bend the tube 16 is removed, the tube can elastically get back to its original straight-like shape.

Figure 3:
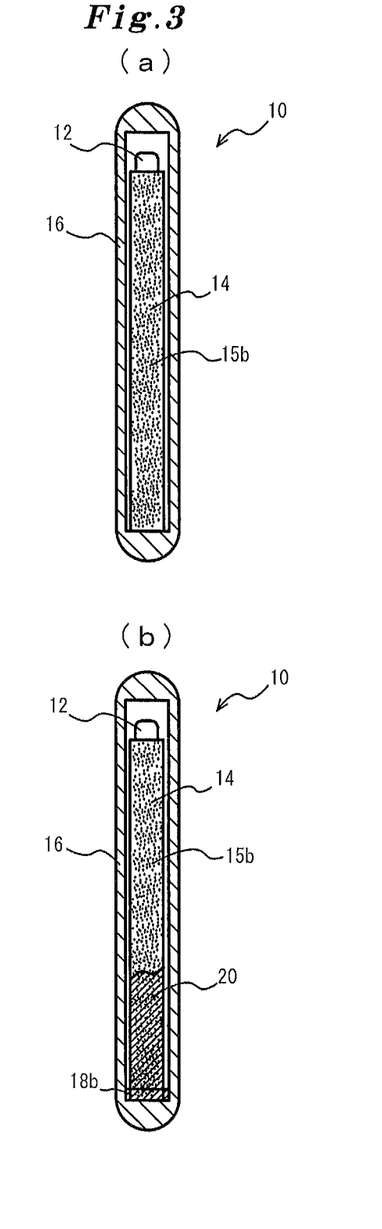
FIG. 3 includes illustrative views showing a change in color of the absorbable membrane 15b of the composite membrane 15 of the heat-sensitive indicator 10 of the present invention.

As shown in FIG. 2(c), the tube 16 that has a restored original straight-like shape is vertically placed in the temperature-controlled atmosphere so as to position the colored melt produced from the solid-state colored heat-sensitive material 18a, which makes it possible to be discharged into the space 14a of the cylindraceous body 14, so that the colored melt gathers at a bottom portion of the cylindraceous body 14. Under such situation, the solid-state colored heat-sensitive material 18a is not yet in contact with the absorbable membrane 15b and only an original color of the absorbable membrane 15b can be visually recognized from the outside of the tube 16, as shown in FIG. 3(a). At the time the ampule bottle 12 is broken, a portion of the solid-state colored heat-sensitive material 18a is smashed down into a powder and/or a fragment which is occasionally discharged into the space 14a of the cylindraceous body 14 through a broken opening of the ampule bottle 12. In this case, the powder-like and/or fragment-like colored heat-sensitive material 18a in the space 14a is in contact with the impermeable membrane 15a of the cylindraceous body 14, but does not come into contact with the absorbable membrane 15b. Therefore, as shown in FIG. 3(a), only the original color of the absorbable membrane 15b can be visually recognized from the outside of the tube 16.

In the heat-sensitive indicator 10, shown in FIG. 2(c) and placed in the temperature-controlled atmosphere, when the temperature of the temperature-controlled atmosphere becomes a temperature at or over the melting temperature of the colored heat-sensitive material 18a, the molten colored melt 18b gathers together with the fragment-like colored heat-sensitive material 18a in the vicinity of the bottom portion of the cylindraceous body 14, as shown in FIG. 2(d). The colored melt 18b which gathers in the vicinity of the bottom portion of the cylindraceous body 14 soaks the edge portion of the absorbable membrane 15b. Therefore, the colored melt 18b is absorbed through the edge portion of the absorbable membrane 15b. As shown in FIG. 3(b), a colored portion 20, which can be visually recognized from the outside of the tube 16, is formed to the absorbable membrane 15b. Such the colored portion 20 irreversibly remains even if the temperature of the temperature-controlled atmosphere is lowered to a temperature not higher than the melting temperature of the colored heat-sensitive material 18a, showing a fact that the temperature-controlled atmosphere was once raised up to a temperature not lower than the melting temperature of the solid-state colored heat-sensitive material 18a. The colored portion 20 can be surely visually recognized from the outside of the tube 16 when the colored portion 20 occupies approximately one third of the area of the absorbable membrane 15.

According to the heat-sensitive indicator 10 shown in FIGS. 1-3, only the colored melt 18b produced from the solid-state colored heat-sensitive material 18a, which makes it possible to be discharged into the space 14a of the cylindraceous body 14 by the breaking ampule bottle 12, is absorbed into the absorbable membrane 15b of the cylindraceous body 14 and colors the absorbable membrane 15b. Therefore, possibility for an erroneous indication caused by permeation of the solid-state colored heat-sensitive material 18a into the absorbable membrane 15b can be prevent. The reliability of the heat-sensitive indicator 10 may be improved.

The heat-sensitive indicator 10 shown in FIGS. 1-3 is placed vertically in the temperature-controlled atmosphere, but it can be placed horizontally. In this case, the coloration of the absorbable membrane 15b is initiated at a part of the absorbable membrane 15b where both edge portions of a piece of the composite membrane 15 are laminated with each other to form the cylindraceous body 14. Further, the ampule bottle 12 is broken by bending both tube 16 and ampule bottle 12 together, but the ampule bottle 12 may be smashed by hitting the tube 16 with a hammer, to discharge the powder-like colored heat-sensitive material 18a from the ampule bottle 12 to the space 14a of the cylindraceous body 14. When the solid-state colored heat-sensitive material 18a has a particle-like shape, as shown in FIG. 2(b), at the time the ampule bottle 12 is broken, the particle-like heat-sensitive material 18a can be discharged into the space 14a of the cylindraceous body 14 through the broken opening. In this case, when the particle-like colored heat-sensitive material 18a is discharged into the space 14a of the cylindraceous body 14, the particle-like colored heat-sensitive material becomes in contact with the impermeable membrane 15a of the cylindraceous body 14, but not in contact with the absorbable membrane 15b. So, only the original color of the absorbable membrane 15b can be visually recognized from the outside of the tube 16 as shown in FIG. 3(a).

EMBODIMENTS

Embodiments of the present invention will be precisely explained hereinafter, but the scope of the present invention is not limited to these examples.

Example 1

To 100 g of linseed oil as a hot-meltable substance having a melting temperature of −19° C., 1 g of red paprika pigment as a coloring material, was added to prepare a colored heat-sensitive material. 0.45 ml of the colored heat-sensitive material was enclosed in an ampule bottle 12 (outer diameter: 4 mm, length: 55 mm). Next, an aluminum deposited paper (25 mm by 50 mm) (OFFMETAL 55K: Trade mark, produced by Takeo Company Limited) having an aluminum-deposited film as an impermeable membrane 15a was bonded to one surface of a paper as an absorbable membrane 15b to use as a composite membrane 15. The composite membrane 15 was rolled up so as to locate the aluminum deposited surface (surface of the impermeable membrane 15a) inside the cylindraceous body 14. The cylindraceous body 14 was inserted into a transparent polyethylene resin-made tube 16 (inner diameter: 5 mm, length: 70 mm, capacity: approximately 1.3 ml). Further, the glass ampule bottle 12, into which the colored heat-sensitive material was enclosed, was inserted into a space 14a of a cylindraceous body 14 in the tube 16. After that both edge portions of the tube 16 were heat-sealed to obtain a heat-sensitive indicator 10. Here, the amount of the colored heat-sensitive material in the ampule bottle 12 was approximately 35% by volume based on the capacity of the tube 16.

The heat-sensitive indicator 10 was chilled in advance at −28° C. for 2 hours. Next, the tube 16 was bent and the ampule bottle 12 was broken so as to make it possible to discharge the solid-state colored heat-sensitive material 18a into the space 14a surrounded by the aluminum deposited surface (the surface of the impermeable membrane 15a), as shown in FIG. 2(c). Thus, a temperature control procedure was started. At that point in time, the original white color of the paper (the color of the absorbable membrane 15b) was only visually recognized from the outside of the tube 16. The atmospheric temperature of −28° C. was raised by 1° C. and then left it as it was for 1 hour, and again the temperature was raised by 1° C. and left it as it was for 1 hour. Such operation was repeated until the atmospheric temperature reached a color-changing temperature in which the area of a red colored portion 20 reached not less than one third of the whole area of the paper (the absorbable membrane 15b) of the composite membrane 15. The color-changing temperature of the heat-sensitive indicator 10, was −19° C. that was approximately equal to the melting temperature of linseed oil as the hot-meltable substance.

Example 2

A heat-sensitive indicator 10 was prepared by similar procedures of Example 1, except for ethylene glycol as the hot-meltable substance having a melting temperature of −12.9° C. was used instead of linseed oil in Example 1. The color-changing temperature of the obtained heat-sensitive indicator 10 was measured according to the similar procedure as described in Example 1. The color-changing temperature of the heat-sensitive indicator 10 was −13° C. that was approximately equal to the melting temperature of ethylene glycol.

Example 3

A heat-sensitive indicator 10 was prepared by similar procedures of Example 1, except for water as the hot-meltable substance having a melting temperature of 0° C., was used instead of linseed oil and C.I. Food Blue 2 (blue pigment) was used instead of red paprika pigment in Example 1. The color-changing temperature of the obtained heat-sensitive indicator 10 was measured according to a similar procedure described in Example 1. The color-changing temperature of the heat-sensitive indicator 10 was 0° C. that was equal to the melting temperature of water.

Example 4

A heat-sensitive indicator 10 was prepared by similar procedures of Example 1, except for the enclosed amount of a heat-sensitive material in an ampule bottle 12 was changed from 0.45 ml (approximately 35% by volume based on a capacity of a tube 16) in Example 1 to 0.1 ml (approximately 8% by volume based on the capacity of the tube 16). The color-changing temperature of the obtained heat-sensitive indicator 10 was measured according to a similar procedure described in Example 1. The color changing-temperature of the heat-sensitive indicator 10 was −19° C. that was equal to that of Example 1.

Example 5

A heat-sensitive indicator 10 was prepared by similar procedures of Example 1, except that a laminate paper in which a polyethylene film as an impermeable membrane 15a was bonded to one surface of a filter paper as an absorbable membrane 15b by an adhesive was used as a composite membrane 15, the composite membrane 15 was rolled up so as to locate the polyethylene film surface (the impermeable membrane 15a) inside a cylindraceous body 14, and the cylindraceous body 14 was inserted into a tube 16. The color-changing temperature of the obtained heat-sensitive indicator 10 was measured according to a similar procedure as described in Example 1. The color-changing temperature of the heat-sensitive indicator 10 was −19° C. that was equal to that of Example 1.

Example 6

A heat-sensitive indicator 10 was prepared by similar procedures of Example 1, except for a water proof paper (OPER MMW 100, Trade name, produced by Nippon Paper Papylia Co., Ltd.) was used instead of the composite membrane 15 in Example 1. The color-changing temperature of the obtained heat-sensitive indicator 10 was measured according to a similar procedure as described in Example 1. The color-changing temperature of the heat-sensitive indicator 10 was −19° C. that was equal to that of Example 1.

Example 7

A heat-sensitive indicator 10 was prepared by similar procedures of Example 6, except for isopropyl myristate having a melting temperature of 9° C. was used instead of linseed oil as the hot-meltable substance in Example 6. The color-changing temperature of the obtained heat-sensitive indicator 10 was measured according to a similar procedure as described in Example 1. The color-changing temperature of the heat-sensitive indicator 10 was 9° C. that was equal to the melting temperature of isopropyl myristate.

Example 8

A heat-sensitive indicator 10 was prepared by similar procedures of Example 6, except for diethyl sebacate having a melting temperature of 3° C. was used instead of linseed oil as the hot-meltable substance in Example 6. The color-changing temperature of the obtained heat-sensitive indicator 10 was measured according to a similar procedure as described in Example 1. The color-changing temperature of the heat-sensitive indicator 10 was 3° C. that was equal to the melting temperature of diethyl sebacate.

Example 9

A heat-sensitive indicator 10 was prepared by similar procedures of Example 6, except for dibutyl sebacate having a melting temperature of −10° C. was used as a hot-meltable substance instead of linseed oil in Example 6. The color-changing temperature of the obtained heat-sensitive indicator 10 was measured according to a similar procedure as described in Example 1. The color-changing temperature of the heat-sensitive indicator 10 was −10° C. that was equal to the melting temperature of diethyl sebacate.

Example 10

A heat-sensitive indicator 10 was prepared by similar procedures of Example 6, except for 2-octanone having a melting temperature of −20° C. was used as a hot-meltable substance instead of linseed oil in Example 6. The color-changing temperature of the obtained heat-sensitive indicator 10 was measured according to a similar procedure as described in Example 1. The color-changing temperature of the heat-sensitive indicator 10 was −20° C. that was equal to the melting temperature of 2-octanone.

Comparative Example 1

A heat-sensitive indicator 10 was prepared by similar procedures of Example 1, except for only filter paper was used instead of the composite membrane 15 in Example 1. The color-changing temperature of the obtained heat-sensitive indicator 10 was measured according to a similar procedure as described in Example 1. The color-changing temperature of the heat-sensitive indicator 10 was −26° C. A change in color of the filter paper was recognized even when the colored heat-sensitive material remained in a solid state. This phenomenon might be caused by the permeation of the solid-state heat-sensitive material into the paper.

Comparative Example 2

A heat-sensitive indicator 10 was prepared by similar procedures of Example 1, except for the enclosed amount of colored heat-sensitive material in the ampule bottle 12 in Example 1 was changed to 0.01 ml (approximately 0.8% by volume based on a capacity of the tube 16). The color-changing temperature of the obtained heat-sensitive indicator 10 was measured according to a similar procedure as described in Example 1. Only red spots appeared on the paper (absorbable membrane 15b) of the composite membrane 15, but the formation of colored portion 20 could not be recognized, so that the color-changing temperature could not be determined.

INDUSTRIAL APPLICABILITY

The heat-sensitive indicator of the present invention can be preferably used far temperature control management for preserving frozen foods or refrigerated foods or for preserving medical drugs, blood, specimen, etc. in the field of medical care.

EXPLANATION OF LETTERS OR NUMERALS

10: heat-sensitive indicator, 12: ampule bottle, 14: cylindraceous body, 14a: space, 15: composite membrane, 15a: impermeable membrane, 15b: absorbable membrane, 16: tube, 18a: solid-state heat-sensitive material, 18b: colored melt, and 20: colored portion.

What is claimed is:

1. A heat sensitive indicator comprising:
an elongated ampule bottle enclosing a colored heat-sensitive material that melts into a colored melt at a predetermined temperature,
a rolled cylindraceous body of a composite membrane joining an absorbable membrane that absorbs the colored melt of the colored heat-sensitive material, onto one surface side of an impermeable membrane that is impermeable to the colored melt, so that the impermeable membrane is located inside the rolled cylindraceous body, and
a tube inserting and sealing the ampule bottle into a space surrounded by the impermeable membrane of the cylindraceous body, through which a color of the absorbable membrane can be visibly recognized from the outside of the tube;
wherein, after at least a part of the ampule bottle is broken below melting point of the colored heat-sensitive material to discharge or to make it possible to discharge at least a portion of the solid-state colored heat-sensitive material into the space surrounded by the impermeable membrane, the colored melt is absorbed through an edge portion of the absorbable membrane which is positioned at an edge surface of the cylindraceous body and then the solid-state colored heat-sensitive material is melted, a formed colored portion of the absorbable membrane can be visibly recognized from the outside of the tube.

2. The heat-sensitive indicator according to claim 1, wherein the colored heat-sensitive material contains a hot-meltable substance, which melts at a predetermined temperature, including a coloring material.

3. The heat-sensitive indicator according to claim 1, wherein the impermeable membrane of the composite membrane is a metal film and the absorbable membrane of the composite membrane is a paper.

4. The heat-sensitive indicator according to claim 3, wherein the metal film is an aluminum foil or an aluminum-deposited film.

5. The heat-sensitive indicator according to claim 1, wherein the impermeable membrane of the composite membrane is a resin film, and an absorbable membrane of the composite membrane is a paper.

6. The heat-sensitive indicator according to claim 1, wherein the tube is a transparent tube made of resin, and the tube deforms elastically when at least a part of the ampule bottle is broken.

7. The heat-sensitive indicator according to claim 1, wherein the ampule bottle is made of glass.

8. The heat-sensitive indicator according to claim 1, wherein an amount of the colored heat-sensitive material, when becomes the colored melt, in the tube is 1% or more by volume based on a capacity of the tube.

9. The heat-sensitive indicator according to claim 1, wherein the colored heat-sensitive material has a melting temperature of 10° C. at the highest.

* * * * *